US012073179B2

(12) United States Patent  
Aher et al.

(10) Patent No.: US 12,073,179 B2  
(45) Date of Patent: Aug. 27, 2024

(54) SYSTEM AND METHODS TO HANDLE CONDITIONAL REQUESTS FOR LIVE PROGRAMS

(71) Applicant: Rovi Guides, Inc., San Jose, CA (US)

(72) Inventors: Ankur Aher, Maharashtra (IN); Susanto Sen, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 18/139,533

(22) Filed: Apr. 26, 2023

(65) Prior Publication Data

US 2023/0267272 A1  Aug. 24, 2023

Related U.S. Application Data

(63) Continuation of application No. 17/067,012, filed on Oct. 9, 2020, now Pat. No. 11,669,685.

(51) Int. Cl.
```
G06F 40/279      (2020.01)
G10L 15/22       (2006.01)
H04L 12/18       (2006.01)
```
(52) U.S. Cl.  
CPC ........... *G06F 40/279* (2020.01); *G10L 15/22* (2013.01); *H04L 12/1813* (2013.01)

(58) Field of Classification Search  
CPC .... G10L 15/22; G06F 40/279; H04L 12/1813  
See application file for complete search history.

(56) References Cited

U.S. PATENT DOCUMENTS

| | | |
|---|---|---|
| 8,769,417 B1 | 7/2014 | Robinson et al. |
| 2002/0178444 A1 | 11/2002 | Trajkovic et al. |
| 2003/0018967 A1 | 1/2003 | Gorbatov et al. |
| 2003/0233155 A1* | 12/2003 | Slemmer ................ G06N 20/00 700/12 |
| 2007/0288627 A1* | 12/2007 | Abella ................. H04N 21/654 348/E7.071 |
| 2011/0109801 A1 | 5/2011 | Thomas et al. |
| 2015/0040176 A1 | 2/2015 | Hybertson et al. |
| 2016/0196312 A1 | 7/2016 | Bastide et al. |

(Continued)

OTHER PUBLICATIONS

PCT International Search Report for International Application No. PCT/US2020/067009, dated Jul. 7, 2021 (15 pages).

(Continued)

*Primary Examiner* — Eric Yen  
(74) *Attorney, Agent, or Firm* — Haley Guiliano LLP

(57) ABSTRACT

Systems and methods are presented herein for providing a user with a notification or with access to live media on an audio/visual user entertainment system based on a user's conditional request for media content. The user may provide the condition of the request by speaking or by entering the condition of the request into an interactive interface. An identification application analyzes the elements of the user's request and generates a question. The application finds a live media stream with identifiers related to the elements and posts the generated question to a live chat forum associated with the live media stream. The application analyzes posts on the forum made by other users to determine if the condition of the user's request is met. When the application determines a post confirms the condition is met, the application generates a notification and provides the user access to the live media stream.

20 Claims, 8 Drawing Sheets

(56) References Cited

U.S. PATENT DOCUMENTS

| | | | |
|---|---|---|---|
| 2018/0150748 A1 | 5/2018 | Bastide et al. |
| 2019/0130899 A1 | 5/2019 | Aravamudan et al. |
| 2019/0288970 A1 | 9/2019 | Siddiq |
| 2019/0289367 A1 | 9/2019 | Siddiq |
| 2022/0114339 A1 | 4/2022 | Aher et al. |

OTHER PUBLICATIONS

Wolf et al., "HuggingFace's Transformers: State-of-the-art Natural Language Processing," 201 Cornell University On-Line Library (2020) (8 pages).

Wolf, Thomas , "Transformers: State-of-the-Art Natural Language Processing", Thomas Wolf et al., Transformers: State-of-the-Art Natural Language Processing, Cornell University Archive, Jul. 14, 2020, at 1-8 (article), Jul. 14, 2020, 1-8.

* cited by examiner

SYSTEM AND METHODS TO HANDLE CONDITIONAL REQUESTS FOR LIVE PROGRAMS

CROSS-REFERENCE TO RELATED APPLICATION

This application is a continuation of U.S. patent application Ser. No. 17/067,012, filed Oct. 9, 2020, which is hereby incorporated by reference herein in its entirety.

BACKGROUND

The present disclosure is directed to systems and methods for providing a user with a notification or with access to live media content, and more particularly, to systems and methods that provide notification or access to live media content based on the user's conditional request for content.

SUMMARY

When consuming content provided by a content platform, a user may often consider changing to different content. In one approach, a user may have to scroll through a program guide and select new content without knowing whether or not the content contains the elements that the user has a particular interest in. The user may then have to manually change user device to display various content streams based on the description, view the content themselves, and decide if they are still interested or wait until the condition that created their initial interest are met. Additionally, a user may choose to return to the original content and could miss the portion of the alternative content that generated the user's interest in the alternative content. This user-executed approach is deficient in that the user often may miss portions of both the initial stream being viewed and the secondary stream the user is interested in without ever consistently accessing content that stirred the user's initial interest.

In another approach, a system can remind a user about certain upcoming scheduled content or automatically switch to presenting another live content stream by reviewing metadata associated with live content streams. Live content streams may have associated metadata available for review through content platform programming guides, which provide the upcoming schedule of live programming and an associated description of a live content stream. For example, a user may request a notification when a certain live show starts, and the system may provide a notification based on metadata of that show that indicates its start time. This approach is deficient when the needed metadata is missing, or when content (e.g., live content) lacks any kind of metadata at all. This metadata analysis approach is also deficient, because available metadata often does not provide details about what is being displayed at each point in time on the live stream. Metadata analysis is limited to available information which is associated with a live stream and does not permit a scene-by-scene or frame-by-frame breakdown of what content is being displayed.

In another approach, a system is configured to conduct on-the-fly deep video or audio analysis of a live stream to detect objects or subjects of interest to a user. This approach is deficient because of larger processing power needed to analyze video to accurately identify the elements of a user's conditional interest and determine when the user's condition is met. To accommodate this approach, a computing system may need to use most of the available processing circuitry and available memory, which may degrade overall performance of the system. This method is also deficient because deep video analysis is limited to what the system is configured to detect within each video frame. If the system is not programmed to recognize the entire list of elements a user may input as an element of a future conditional request, the system may not be able to find a live stream that meets the condition of the user's request. What is needed is a way for the system to notify the user when a content platform is showing content (e.g., a live stream) that meets the condition of a user's interest and provide the user with a notification or access to the relevant content once the condition of the user's interest are met without relying on metadata or wasting processing resources by performing live video or audio analysis.

These deficiencies are solved by the systems and methods described herein, which process a user's request for a notification to be provided when the content of a live media stream matches the condition of the user's request and provide the user access to the live stream that matches the condition. The user provides the request by either a voice command or a text input through a communication interface with a user equipment device. For example, the conditional request could be, "Hey assistant, switch to the game once Messi goes onto the field." The system generates a question that, when answered affirmatively, may confirm that the condition of the user's request is met. For example, the generated question could be, "Did Messi go on the field?" The system posts the generated question onto the network forum associated with a live media stream. As other users who are currently viewing the stream post comments on the live stream, the system analyzes the posts subsequent to the generated question for affirmations that the condition in the request is met by analyzing the posts in the network forum that are generated by other users. Once the system determines that a post confirms the stream meets the request criteria, a notification to the user is generated and the user is given access to the content in the new media stream.

These techniques solve the problems of other approaches described above. In particular, this approach does not rely on metadata and expensive processing power. This approach relies on the review of the content of network forum posts subsequent to a generated question posted in a network forum of a live media stream that has identifying data associated with the condition of the user's request. This approach addresses the deficiencies in only relying on metadata by eliciting responses from current viewers of a live content stream to determine if the elements of the user's condition are present in the live portion of the media stream. By relying on the input of current users, as opposed to reviewing metadata associated with a live media stream, the system can confirm a user's condition which may be unique. The approach also addresses the deficiencies in relying on expensive processing power by only requiring the system to process a request, generate text for a post, and review the text of responses, without requiring an expansive library of video elements in an attempt to predict the varying criteria of a user's conditional request.

In some embodiments, the system has a predetermined threshold defined. The threshold comprises a required number of posts in the forum to affirm that the condition of the request is met by the media stream before providing a notification to the user. The system may not provide a notification to the user (or switch to content) until the number of posts that are determined to affirm the condition of the request meet or exceed the threshold.

In some embodiments, the user may not be logged in to all the live content servers available on the user equipment through the communication network. When a user provides the system with a conditional request for live content, the system first checks which, if any, of the live content servers the user is logged in to. For each respective server the user is not logged into, the system generates a username and login information based on the user's profile associated with the user equipment.

In some embodiments, the system is unable to find network forum posts that confirm the condition of the user's request is met. The system may have a predetermined buffer timer enabled, (e.g., a one-minute buffer timer). After posting a question to the network forum, the system reviews subsequent posts for indications that the user's conditional request is currently satisfied or may be satisfied in the near future for the duration of the buffer timer. When the question is posted, the buffer timer starts counting down. If no affirmative answer is detected upon the expiration of the buffer timer, the system may generate a new related question and post the new question to the network forum with a new buffer timer countdown. The buffer time is updated when the system detects a forum post with a time element in the response. For example, a response may be "Messi will be on the field in 5 minutes," and the system may update the buffer time to recheck the network forum for posts that confirm the condition after the five-minute period has expired.

BRIEF DESCRIPTIONS OF THE DRAWINGS

The above and other objects and advantages of the disclosure will be apparent upon consideration of the following detailed description, taken in conjunction with the accompanying drawings, in which.

DETAILED DESCRIPTION

Methods and systems are provided herein for providing access to live media content that meets the criteria of a user-generated conditional request.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory (RAM), etc.

Figure 1:
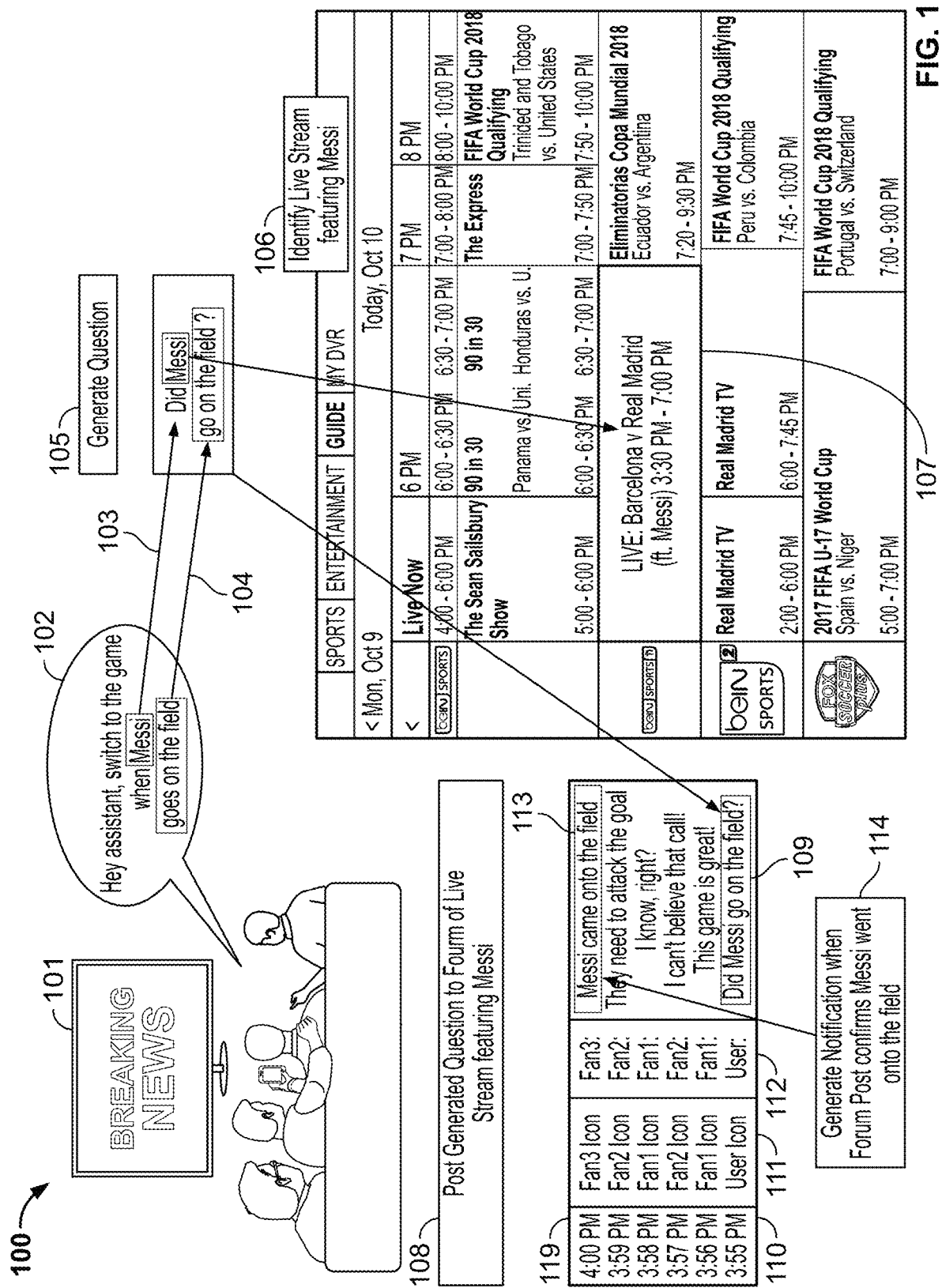
FIG. 1 illustrates an example of a computerized audio/video user entertainment system, in accordance with some embodiments of the disclosure.
Figure 1:
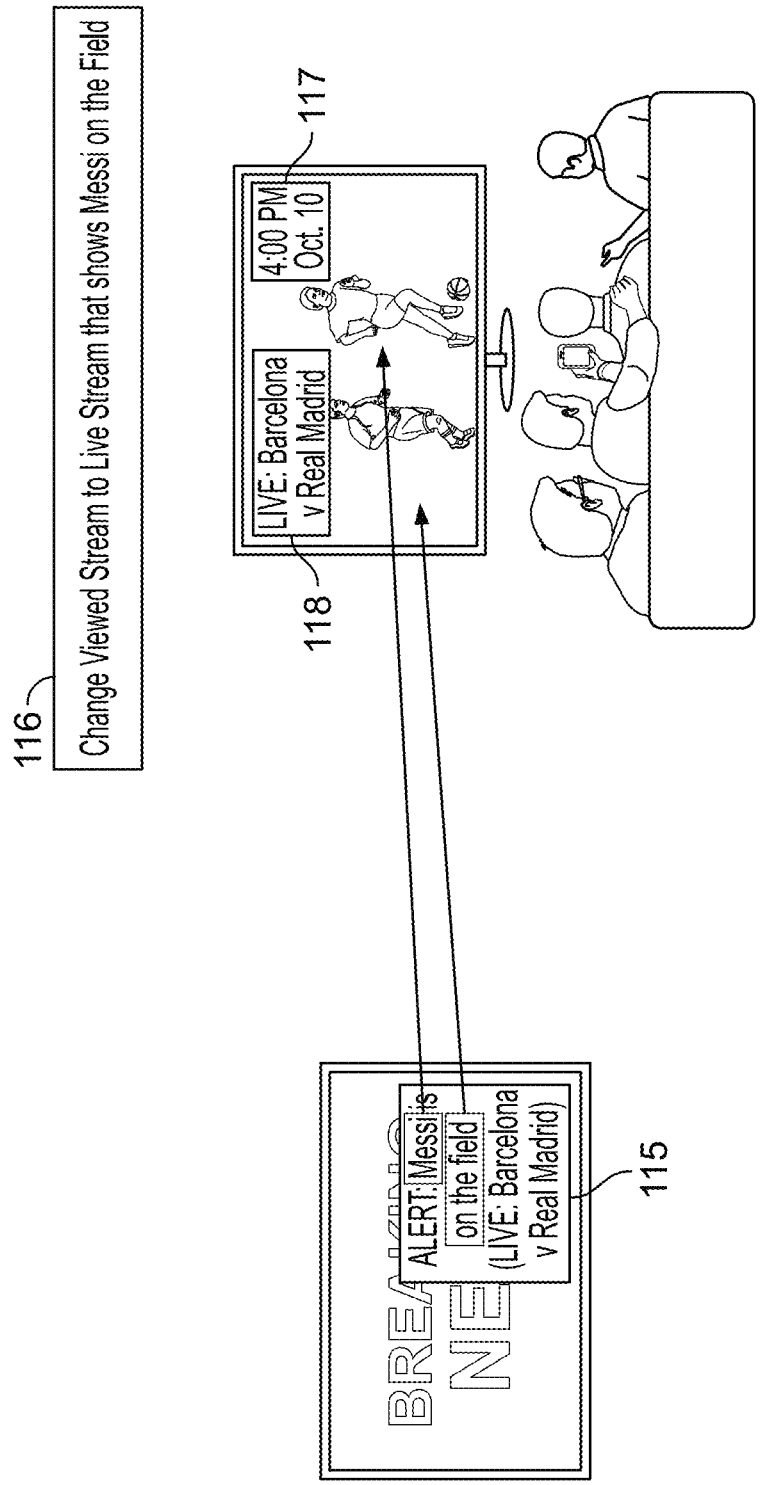

FIG. 1 depicts an example 100 of an audio/video user entertainment system. The audio/video user entertainment system may include audio outputs, video display 101, interactive menus, a microphone for recording a user's commands for the system, and a device such as a remote, which would allow the user to input text into a field in an interactive interface to provide a command to the user entertainment system. In some embodiments, one of the users verbalizes a conditional request 102. For example, the conditional request can comprise a wake-up command such as "Hey assistant" to active the appropriate input/output circuitry in the user equipment system. In some embodiments, the request comprises a noun of interest 103, and a verb with a connecting condition that the noun of interest must execute 104. For example, the user wants to watch a Barcelona soccer game, but only when the player Messi is playing on the field. The user's request 102 may be "Hey assistant, switch to the game when Messi goes on the field." The identification application may receive the request, which is then reviewed by the identification application. The identification application may extract the noun "Messi," the verb "goes," and the connecting condition "when . . . on the field." Based on the extracted elements, the identification application may generate a question 105 that, when answered affirmatively, would confirm that the condition of the user's request is met. For example, the generated question could be, "Did Messi go on the field?" In one example, the identification application may utilize a suitable intent analyzer to determinate the intent of question 102. The intent analyzer may be capable of determining the context of a request and is capable of determining content related to the elements of the user's request. In some embodiments, the identification application my also use a suitable question generator to generate question 105 based on the determined intent.

For example, the identification application may utilize HuggingFace's Transformers library of algorithms to determine intent and/or to generate questions based on the determined intent. HuggingFace's Transformers library is described, for example, in Thomas Wolf et al., *Transformers: State-of-the-Art Natural Language Processing*, Cornell University Archive, Jul. 14, 2020, at 1-8), which is hereby incorporated by reference herein in its entirety.

In another example, multiple users may be present in the vicinity of the audio/video user entertainment system. For example, the multiple users may be engaged in conversation related to what live stream they want view on video display 101. In some embodiments, the identification application is configured to identify a particular noun that is the subject of the conversation and generate a question by reviewing the conversation in pieces to understand the context of the statements as well as the intents and preferences of the participants in the conversation. The question, when answered, may provide the identification application with a confirmation that at least one live stream is relevant to the conversation the users are having. In this embodiment, the identification application is then configured to provide a notification to the users that a live stream contains content relevant to their conversation and may provide access for the users to the live steam if the users' interest is confirmed.

In some embodiments, the identification application identifies a live stream at 106 that incorporates descriptive elements featuring noun 103 and terms related to noun 103 by reviewing the live streams available on the user entertainment system by looking for descriptive data 107 that includes the noun or other terms associated with the noun. In this embodiment, the identification application enters the live network forum associated with the live stream and posts 108 generated question 109. For example, the provider of content may also provide a forum associated with the live stream. The identification application may recognize the time stamp of when the generated question was posted 110, may recognize user icon 111 of the profile used to post the generated question, and username 112 associated with the profile used to post the generated question. In some embodiments, the identification application may review network forum posts subsequent to the posted question time stamp and wait for a responding post in network forum 119 that confirms the condition of the requested condition is met. The period of time during which the identification application reviews network forum posts may be bounded by a small time window. For example, the time window may be equal to the duration of the buffer time. In another example, the time window may be shorter than the buffer time. By defining a finite period of time for analyzing the network forum posts, the identification application reduces the amount of computing resources required during the execution of the described process. For example, responding post 113 may include text such as, "Messi came onto the field." In some embodiments, after determining a responding post confirms the conditional request is satisfied, the identification application generates 114 a notification 115 for the user to see on the user entertainment system display that contains the nature of the notification and descriptive elements of the live stream that meets the criteria of the conditional request. The identification application then changes the media content the user is consuming to live media stream 116, for example by providing a descriptive overlay with current date and time 117 as well as metadata 118 associated with the live stream.

In some embodiments, the identification application is capable of changing the media content the user is consuming to the live media stream that meets the criteria of the conditional request without providing the user with a notification. For example, a responding post may include text such as, "Messi is on the field right now and is showing amazing skills!" In this example, the identification application is able to recognize that the condition is met at a current moment and the user may want to see the new live stream considering the urgency of the response compared to the condition of the user's request. By providing the user immediate and automatic access to the live stream, the identification application provides the user with a seamless transition to their desired live media content without utilizing excess processing power to generate a notification and without delaying the change to the preferred live media content.

The identification application is capable of generating the question through a variety of methods. For example, the identification application includes a user intent analyzer which is able to process statements that are input into the user entertainment system. The intent analyzer utilized herein is analogous to the intent analyzer described in U.S. patent application Ser. No. 16/171,093 to Murali Aravamudan et al., and is comparable to the recommendation engine of U.S. patent application Ser. No. 16/528,537 to Siddartha Pande et al., both of which are here-by incorporated by reference herein in their entireties. The intent analyzer is able to parse a user's statement into a relevant noun and a relevant verb. The intent analyzer additionally has a stored library of context indicators to assist in the generation of an appropriate question that, when answered, confirms the user's conditional request is met. In another example, the identification application is able to convert the user's input statement into a Boolean yes/no question by rearranging a significant noun and a significant verb. In another example, the identification application utilizes the HuggingFace's Transformers library of algorithms to rearrange the elements of a user's input to create a question that, when answered affirmatively, can confirm that the condition of the user's request is met.

Figure 2:
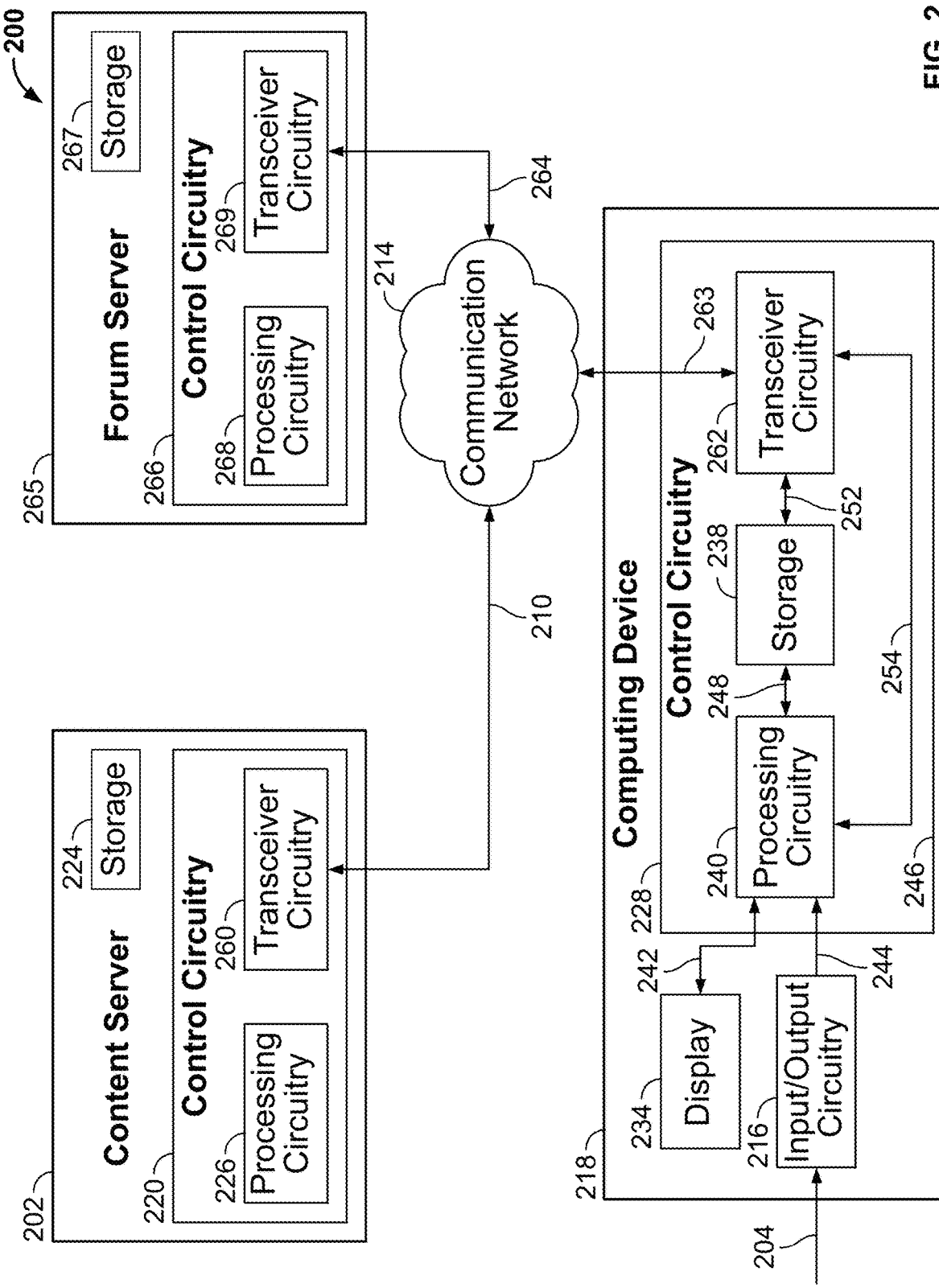
FIG. 2 is a block diagram representing devices, components of each device, and data flow therebetween for an audio/video user entertainment system incorporating conditional request processing features, in accordance with some embodiments of the disclosure.

In some embodiments, the identification application is capable of accessing forum server 265, e.g., as shown in FIG. 2. The identification application is capable of utilizing the processing of multiple modules connected by communication network 214 to find and review the content of forum posts. The identification application is capable of utilizing the intent analyzer, which was used to generate the initial question, to process posts made by other users of the network forum subsequent to the generated question to determine if a post incorporates information that does not directly answer the generated question and contains information that is related to the elements of the generated question. For example, a subsequent post may say, "Number 10 for Barcelona is on the field." The identification application is capable of utilizing server processing circuitry from the various modules of FIG. 2, along with the intent analyzer, to determine that "Number 10 for Barcelona" is related to the subject of the original request, Messi, by accessing and reviewing any related information that each respective module in FIG. 2 can access from memory or through communication network 214.

FIG. 2 is an illustrative block diagram showing an audio/video user entertainment system incorporating features to provide a user access to live media content that satisfies the condition of a user's conditional request, in accordance with some embodiments of the disclosure. In FIG. 2, an audio/video user entertainment system is configured as an audio/video user entertainment system 200, in accordance with some embodiments of the disclosure. In some embodiments, one or more parts of or the entirety of system 200 may be configured as a system implementing various features, processes, and components of FIGS. 1 and 3-6. Although FIG. 2 shows a certain number of components, in various examples, system 200 may include fewer than the illustrated number of components and/or multiples of one or more of the illustrated number of components.

System 200 is shown to include a computing device 218, a content server 202, a forum server 265, and a communication network 214. It is understood that while a single instance of a component may be shown and described relative to FIG. 2, additional instances of the component may be employed. For example, content server 202 and forum server 265 may include, or may be incorporated in, more than one server. Similarly, communication network 214 may include, or may be incorporated in, more than one communication network. Content server 202 and forum server 265 are each shown communicatively coupled to computing device 218 through communication network 214. While not shown in FIG. 2, server 202 may be directly communicatively coupled to computing device 218, for example, in a system absent or bypassing communication network 214.

Communication network 214 may comprise one or more network systems, such as, without limitation, Internet, LAN, WiFi or other network systems suitable for audio processing applications. In some embodiments, system 200 excludes server 202, and functionality that would otherwise be implemented by content server 202 or forum server 265 is instead implemented by other components of system 200, such as one or more components of communication network 214. In still other embodiments, content server 202 and forum server 265 work in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214, content server 202 or forum server 265 or a combination of the same. In other embodiments, computing device 218 works in conjunction with one or more components of communication network 214 or content server 202 or forum server 265 to implement certain functionality described herein in a distributed or cooperative manner.

Computing device 218 includes control circuitry 228, display 234 and input/output circuitry 216. Control circuitry 228 in turn includes transceiver circuitry 262, storage 238 and processing circuitry 240. In some embodiments, computing device 218 or control circuitry 228 may be configured as varying embodiments of audio/visual user entertainment system device 101 FIG. 1.

Content server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 224, 238 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 224, 238 or instead of storages 224, 238. In some embodiments, the audio portion of a conference between multiple participants may be recorded and stored in one or more of storages 224, 238.

Forum server 265 includes control circuitry 266 and storage 267. Each of storages 267 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 267, 238 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 267, 238 or instead of storages 267, 238. In some embodiments, the audio portion of a conference with multiple participants may be recorded and stored in one or more of storages 267, 238.

In some embodiments, control circuitry 220 and/or 228 executes instructions for an identification application stored in memory (e.g., storage 224 and/or storage 238). Specifically, control circuitry 220 and/or 228 may be instructed by the identification application to perform the functions discussed herein. In some implementations, any action performed by control circuitry 220 and/or 228 may be based on instructions received from the identification application. For example, the identification application may be implemented as software or a set of executable instructions that may be stored in storage 224 and/or 238 and executed by control circuitry 220 and/or 228. In some embodiments, the identification application may be a client/server application where only a client application resides on computing device 218, and a server application resides on content server 202.

In some embodiments, control circuitry 266 and/or 228 executes instructions for the identification application stored in memory (e.g., storage 267 and/or storage 238). Specifically, control circuitry 266 and/or 228 may be instructed by the identification application to perform the functions discussed herein. In some implementations, any action performed by control circuitry 266 and/or 228 may be based on instructions received from the identification application. For example, the identification application may be implemented as software or a set of executable instructions that may be stored in storage 267 and/or 238 and executed by control circuitry 266 and/or 228. In some embodiments, the identification application may be a client/server application where only a client application resides on computing device 218, and a server application resides on forum server 265.

The identification application may be implemented using any suitable architecture. For example, it may be a stand-alone identification application wholly implemented on computing device 218. In such an approach, instructions for the identification application are stored locally (e.g., in storage 238), and data for use by the identification application is downloaded on a periodic basis (e.g., from an out-of-band feed, from an Internet resource, or using another suitable approach). Control circuitry 228 may retrieve instructions for the identification application from storage 238 and process the instructions to perform the functionality described herein. Based on the processed instructions, control circuitry 228 may determine a type of action to perform in response to input received from input/output circuitry 216 or from communication network 214. For example, in response to a user providing a conditional request after speaking the wake-up command, control circuitry 228 may perform the steps of process 300 (FIG. 3), process 400 (FIG. 4), process 500 (FIG. 5), process 600 (FIG. 6), or processes relative to various embodiments.

In client/server-based embodiments, control circuitry 228 may include communication circuitry suitable for communicating with an application server (e.g., content server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 214). In another example of a client/server based application, control circuitry 228 runs a web browser that interprets web pages provided by a remote server (e.g., content server 202). For example, the remote server may store the instructions for the identification application in a storage device. The remote server may process the stored instructions using circuitry (e.g., control circuitry 228) and/or generate displays. Computing device 218 may receive the displays generated by the remote server and may display the content of the displays locally via display 234. This way, the processing of the instructions is performed remotely (e.g., by content server 202) while the resulting displays, such as the display windows described elsewhere herein, are provided locally on computing device 218. Computing device 218 may receive inputs from the user via input/output circuitry 216 and transmit those inputs to the remote server for processing and generating the corresponding displays. Alternatively, computing device 218 may receive inputs from the user via input/output circuitry 216 and process and display the received inputs locally, by control circuitry 228 and display 234, respectively.

Content server 202 and computing device 218 may transmit and receive content and data such as media content via communication network 214. For example, content server 202 may be a media content provider, and computing device 218 may be a smart television configured to download or stream media content, such as a live news broadcast, from content server 202. Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

Forum server 265 and computing device 218 may transmit and receive content and data such as media content via communication network 214. For example, forum server 265 may be the network forum associated with a live media content stream available on content server 202, and computing device 218 may be a smart television configured to download or stream media content, such as a Harry Potter movie, from content server 202. Control circuitry 266, 228 may send and receive commands, requests, and other suitable data through communication network 214 using transceiver circuitry 269, 262, respectively. Control circuitry 266, 228 may communicate directly with each other using transceiver circuits 269, 262, respectively, avoiding communication network 214.

It is understood that computing device 218 is not limited to the embodiments and methods shown and described herein. In nonlimiting examples, computing device 218 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smart-phone, or any other device, computing equipment, or wireless device, and/or combination of the same capable of suitably displaying and manipulating media content.

Control circuitry 220, 266 and/or 228 may be based on any suitable processing circuitry such as processing circuitry 226, 268 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 220 and/or control circuitry 266 and/or control circuitry 228 are configured to implement a media content operation system, such as systems, or parts thereof, that perform various media content manipulation processes described and shown in connection with FIGS. 1 and 3-6, and/or systems carrying out the features described and shown relative to FIGS. 1 and 3-6.

Computing device 218 receives a user input 204 at input/output circuitry 216. For example, computing device 218 may receive a user input such as a user swipe or user touch, as previously discussed. In some embodiments, computing device 218 is a media device (or player) configured as devices 101 or 202, with the capability to access media content. It is understood that computing device 218 is not limited to the embodiments and methods shown and described herein. In nonlimiting examples, computing device 218 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 204 may be received from a user selection-capturing interface that is separate from device 218, such as a remote-control device, trackpad or any other suitable user movement sensitive or capture devices, or as part of device 218, such as a touchscreen of display 234. Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 216 may comprise a physical input port such as a 3.5 mm audio jack, RCA audio jack, USB port, ethernet port, or any other suitable connection for receiving audio over a wired connection, or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 240 may receive input 204 from input circuit 216. Processing circuitry 240 may convert or translate the received user input 204 that may be in the form of gestures or movement to digital signals. In some embodiments, input circuit 216 performs the translation to digital signals. In some embodiments, processing circuitry 240 (or processing circuitry 226, as the case may be) carries out disclosed processes and methods. For example, processing circuitry 240 or processing circuitry 226 may perform processes 300, 400, 500, and 600 of FIGS. 2 and 4-6, respectively.

Figure 3:
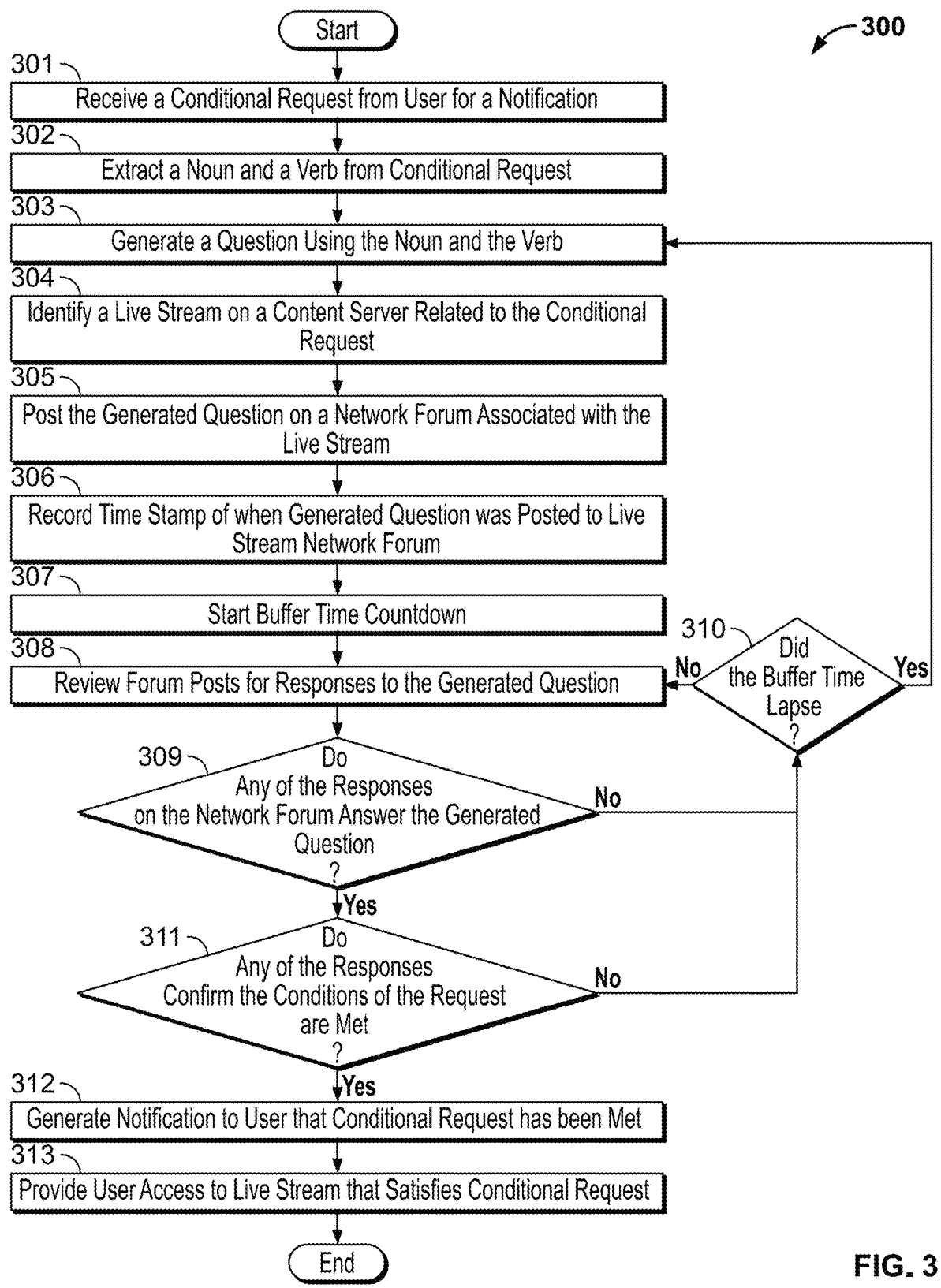
FIG. 3 is a flow-chart of an illustrative process for generating a notification that a user's conditional request for media content has been satisfied and providing the user access to the media content that satisfies the criteria of the user's conditional request, in accordance with disclosed methods and embodiments.

FIG. 3 is a flowchart of an exemplary process 300 for providing a conditional request to an audio/visual user entertainment system, wherein the identification application then provides the user access to a live media stream that meets the criteria of the conditional request. Process 300 or any step thereof could be performed on, or provided by, any device shown in FIG. 2 and can incorporate various user interfaces (e.g., display 234 of FIG. 2). For example, process 300 may be executed by control circuitry 228 (FIG. 2) of user equipment 218. In addition, one or more steps of process 300 may be incorporated into or combined with one or more steps of any other process or embodiment (e.g., process 400 of FIG. 4, process 500 of FIG. 5, process 600 of FIG. 6).

At 301, a conditional request from a user is received by input/output circuitry 216 in computing device 218, from FIG. 2, from one of a plurality of users consuming media content on an audio/visual user entertainment system. For example, the user provides the request by speaking a wake-up command for a microphone, which is connected to computing device 218 and contains input/output circuitry 216. At 302, control circuitry (e.g., control circuitry 228, from FIG. 2), extracts a noun and a verb from the conditional request. At 303, the control circuitry generates a question (e.g., using algorithms from the HuggingFace's Transformers library) comprised of the noun and the verb, which, when answered affirmatively, may confirm that the condition of the user's request is met. At 304, the control circuitry identifies a live stream on a content server is related to the noun from the conditional request. For example, as shown in FIG. 2, content server 202 is one of a plurality of content servers that the user entertainment system has access to through a communication network 214. At 305, the control circuitry finds the network forum associated with the live stream and posts the generated question associated with the live stream. For example, as shown in FIG. 2, forum server 265 is accessible by the user entertainment system, exemplified by computing device 218, which utilizes transceiver circuitry 262 to generate multidirectional communication stream 263 to communication network 214, which then identifies multidirectional communication streams 210 and 264 for transceiver circuitry 260 and 269, respectively, for content server 202 and forum server 265, respectively. At 306, the control circuitry records the time stamp of when the generated question was posted to the live stream network forum in storage 238. For example, as shown in FIG. 1, each network forum post will have metadata associated with each respective post indicating the time 110 when the post was generated in the network forum. At 307, the control circuitry starts the buffer time countdown using processing circuitry 240, which monitors the reference time using multidirectional communication stream 248 with storage 238. For example, the buffer time is a predetermined period of time, maintained in storage 238 in the identification application settings as a default value.

At 308, the control circuitry reviews network forum posts through transceiver circuitry 262, which provides processing circuitry 240 with the content of the posts through multidirectional communication stream 254. Each post has a respective time stamp, which is after the time stamp of the generated question. Processing circuitry 240 reviews the content of the post for responses that confirm the condition in the generated question is met. The review may occur over a relatively small period of time. The period of time may be as long as the buffer time or may be shorter than the buffer time. In some embodiments, the period of time may be variable. For example, the control circuitry may detect a plurality of responses with time stamps that are close together that all confirm the condition is met. In this example, the system may reduce the buffer time or eliminate it to provide the user immediate access to the live media content.

At 309, if the control circuitry determines that none of the subsequent forum posts answer the question generated at step 303, the identification application checks if the buffer time lapsed and proceeds to step 310. At 310, if the control circuitry determines that that the buffer time has not lapsed, the identification application continues to review network forum posts for responses to the generated question at step 308. At 310, if the control circuitry determines that the buffer time has lapsed, the identification application generates a new question using the noun and verb from the conditional request at step 303. At step 309, if the control circuitry determines that one of the subsequent forum posts answer the generated question, the identification application analyzes the post identified as an answer to the generated question at step 311 to determine if the answers confirms if the condition of the user's request is met.

At step 311, if the control circuitry determines that the response does not confirm the condition of the request is met, the identification application then reviews if the buffer time lapsed at 310. At step 311, if the control circuitry utilizes the intent analyzer encoded in processing circuitry 240 to determine that the response does confirm the condition of the request is met, the identification application then generates a notification to the user that the conditional request has been satisfied at 312 and provides the user access to the live stream that satisfies the conditional request at 313. For example, as shown in FIG. 1, the notification 115 appears on the display of the user entertainment system as an overlay over the currently viewed media content, and the viewed media content is changed to the live stream that satisfies the criteria of the conditional request 102.

Figure 4:
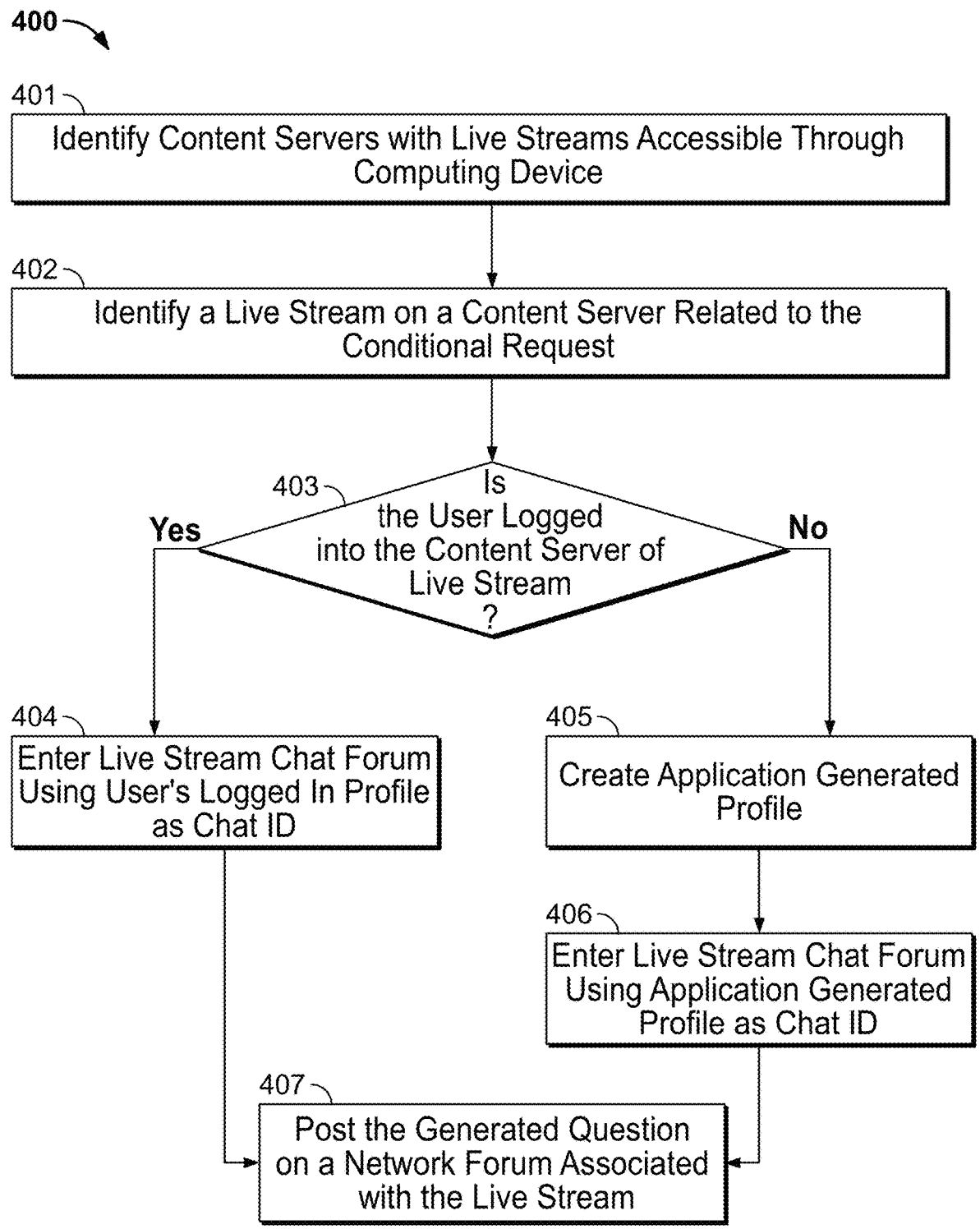
FIG. 4 is a flow-chart of an illustrative process for posting a question onto a network forum, in accordance with some disclosed methods and embodiments.

FIG. 4 is a flowchart of an exemplary process 400 for logging into the forum server related to a live stream that is related to the elements of a user's conditional request. It should be noted that process 400 or any step thereof could be performed on, or provided by, any device shown in FIG. 2 and can incorporate various user interfaces (e.g., display of FIG. 2). For example, process 400 may be executed by control circuitry 228 (FIG. 2) of the user equipment 218. In addition, one or more steps of process 400 may be incorporated into or combined with one or more steps of any other process or embodiment (e.g., starting at process block 304 in process 300 of FIG. 3, starting at process block 502 in process 500 of FIG. 5, starting at process block 602 in process 600 of FIG. 6). In addition, FIG. 1 provides a depiction of an exemplary embodiment of the processes described herein.

At 401, the control circuitry identifies a plurality of content servers that contain a plurality of live media streams that the audio/visual user entertainment system has access to through the computing device portion of the system by identifying, through multidirectional communication stream 263 with communication network 214, how many connections to content servers are active by content server communication stream 210, which may be multiple in nature. At 402, the control circuitry identifies a live media stream on at least one of the content servers the system has access to by reviewing in processing circuitry 226 which content streams are live, while also accessing information in storage 224 to extract additional related information. At step 403, if the control circuitry determines the user is logged in to the content server of the live stream, the identification application enters the live media stream network forum associated with the live stream though network forum communication stream 264 using the user's logged-in profile as the chat ID at step 404, once the system gets past the security protocol in transceiver circuitry 269 and gains access to the forum itself in processing circuitry 268. For example, the forum server may generate for display for other users the user icon in icon field 111 of the forum, from FIG. 1, and the user profile name in the profile name field 112 of the forum, from FIG. 1.

At 407, the control circuitry may then post the generated question using the user identifiers associated with the user profile in the network forum on forum server 265 using communication stream 263 and forum communication stream 264 through communication network 214. At step 403, if the control circuitry application determines the user is not logged in to the content server of the live stream, the identification application generates an identification application-generated profile at step 405 and enters the live stream network forum using the identification application-generated profile as the chat ID at step 406 to get past the security protocols enabled in transceiver circuitry 269. For example, the forum server may generate for display for other users a identification application-generated icon in icon field 111 of the forum, from FIG. 1, and an identification application-generated profile name in profile name field 112 of the forum, from FIG. 1. At 407, the identification application may then post the generated question using the identification application-generated identifiers associated with the identification application generated profile.

For example, a network forum server may have protocols enabled to block certain network forum postings that are not associated with a user profile. The identification application-generated profile may incorporate all the elements of a user generated profile to permit the identification application-generated profile to get past the blocking protocols of network forum servers. In another example, multiple profiles can be created for each respective forum server the system is capable of accessing. In another example, the identification application generates a different profile for each respective posting of a question in each respective network forum in response to the buffer time lapsing before the identification application is able to confirm the user's conditional request is met. In another example, the identification application is capable of generating a unique question for each respective profile generated to access each respective forum server. In this example, the identification application is capable of accessing all servers and processing circuitry accessible through communication network 214, from FIG. 2, to broaden the scope of the questions, in order to compel more relevant responses from other users posting in the network forums.

Figure 5:
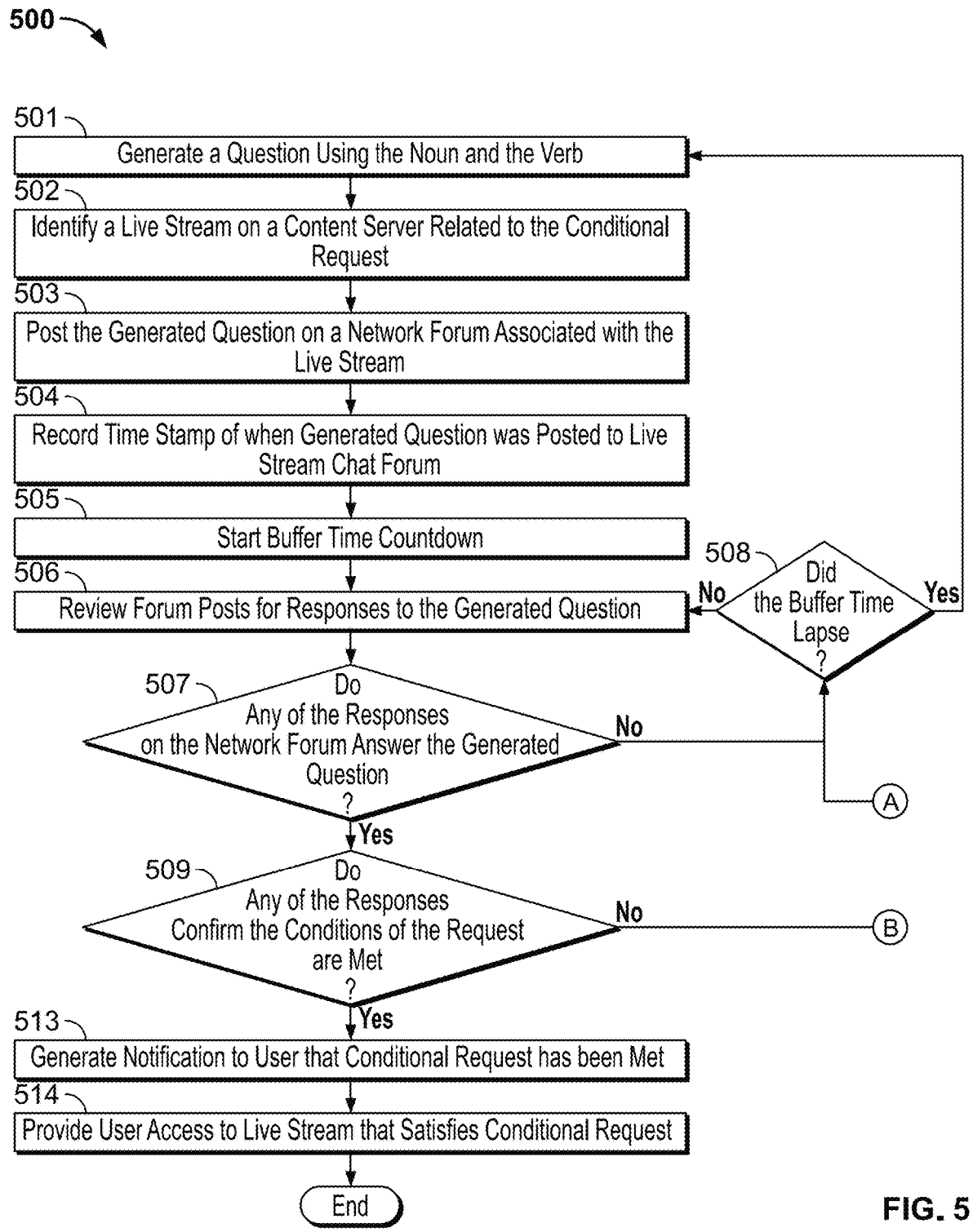
FIG. 5 is a flow-chart of an illustrative process for updating the buffer time based on a review of responses to the posted question in the network forum, in accordance with some disclosed methods and embodiments.
Figure 5:
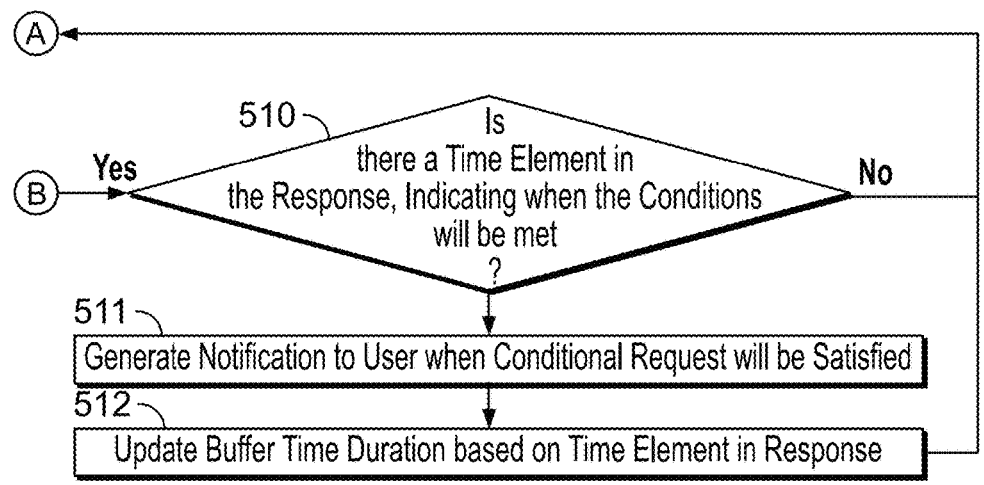

FIG. 5 is a flowchart of an exemplary process 500 for updating the duration of the buffer time based on the responses to the generated question in a network forum. It should be noted that process 500 or any step thereof could be performed on, or provided by, any device shown in FIG. 2 and can incorporate various user interfaces (e.g., display of FIG. 2). For example, process 500 may be executed by control circuitry 228 (FIG. 2) of user equipment 218. In addition, one or more steps of process 500 may be incorporated into or combined with one or more steps of any other process or embodiment (e.g., starting at process block 303 in process 300 of FIG. 3, replacing process blocks 502 and 503 with process blocks 401-407 in process 400 of FIG. 4, incorporating after process block 509, in response to a YES, process block 610 in process 600 of FIG. 6). In addition, FIG. 1 provides a non-technical depiction of an exemplary embodiment of the processes described herein.

At 501, the control circuitry generates a question using the noun and the verb which, when answered affirmatively, may confirm that the condition of the user's request is met. The noun and the verb are extracted from the user's request and are processed by processing circuitry 240, which in some embodiments has an intent analyzer encoded therein and may use algorithms from HuggingFace's Transformers library. At 502, the control circuitry identifies a live stream is ready for display in processing circuitry 226 on content server 202, that is related to the noun from the user's request. For example, as shown in FIG. 2, content server 202 is one of a plurality of content servers that the user entertainment system has access to through communication network 214, and communication stream 210 connects the control circuitry of device 218 to the control circuitry of content server 202 through communication network 214. At 503, the control circuitry finds the network forum associated with the live stream by utilizing communication network 214 to establish communication streams 210, 263, and 264, which enable the respective transceiver circuitries 260, 262, and 269 of content server 202, computing device 218, and forum server 265 to establish and maintain communication. The control circuitry then posts the generated question associated with the live stream on the forum related to the selected live stream in forum server 265. For example, as shown in FIG. 2, forum server 265 is accessible by the user entertainment system through a communication network 214. At 504, the identification application records the time stamp of when the generated question was posted to the live stream network forum. For example, as shown in FIG. 1, each network forum post may have metadata associated with each respective post indicating the time 110 when the post was generated in the network forum. At 505, processing circuitry 240 starts the buffer time countdown. For example, the buffer time is one minute, and is saved in the identification application settings as a default value.

At 506, the processing circuitry reviews network forum posts generated by other users after the time stamp of the generated question for a response that confirms the condition in the generated question are met. At 507, if the processing circuitry determines that none of the subsequent forum posts answer the generated question, the identification application checks if the buffer time lapsed at step 508. At 508, if the processing circuitry determines that that the buffer time did not lapse, the identification application continues to review network forum posts at step 506 for responses to the generated question. At 508, if the processing circuitry determines that the buffer time did lapse, the identification application generates a new question using the noun and verb from the conditional request at step 501. For example, the processing circuitry may process the noun and the verb utilizing alternative phrases generated by the intent analyzer and then producing a new question using the HuggingFace's Transformers library.

At 507, if the processing circuitry determines that one of the subsequent forum posts answers the generated question, the identification application analyzes the post identified as an answer to the generated question at step 509 to determine if the answer confirms if the condition of the user's request is met. At 509, if the processing circuitry determines that the response does confirm the condition of the request is met, the identification application then generates a notification to the user that the conditional request has been satisfied at step 513 and provides the user access to the live stream that satisfies the conditional request at step 514. For example, as shown in FIG. 1, notification 115 appears on the display of the user entertainment system as an overlay over the currently viewed media content, and the viewed media content is changed to the live stream that satisfies the criteria of conditional request 102. At step 509, if the processing circuitry determines that the response does not confirm the condition of the request is met, the identification application then analyzes the response for a time element at step 510.

At 510, if the processing circuitry determines that a response that confirms the condition, based on analysis performed by the intent analyzer encoded onto processing circuitry 240, of the request has a time element, the identification application generates a notification that displays for the user when the conditional request may be met 511 and updates the buffer time duration based on the time element in response 512. For example, a response may be "Messi will be on the field in five minutes," and the identification application may update the buffer timer from the default value of one minute to five minutes. At 508, the identification application may then review if the buffer time lapsed. At 510, if the processing circuitry determines that a response that confirms the condition of the request does not have a time element, the identification application may then review if the buffer time lapsed at 508.

Figure 6:
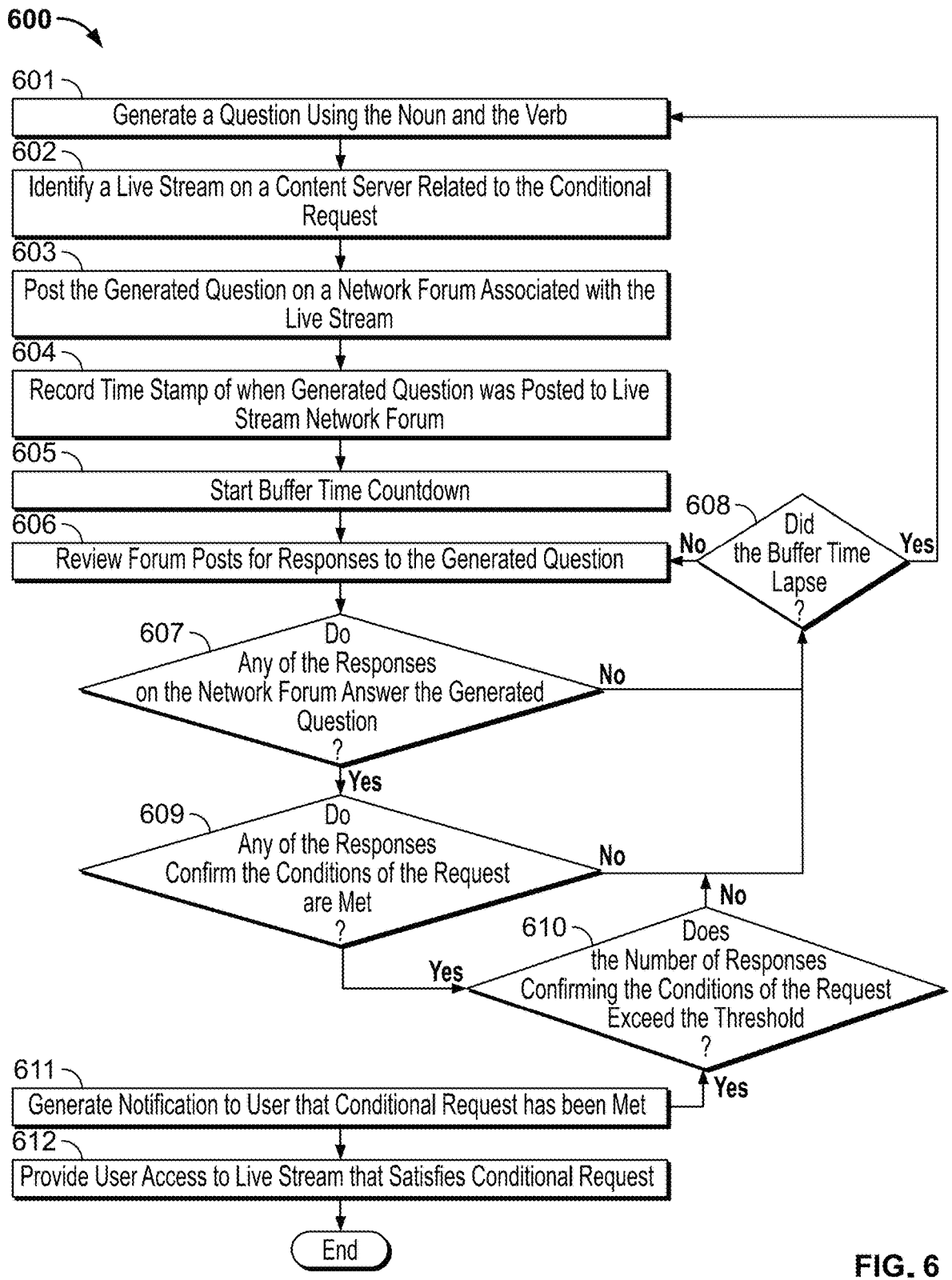
FIG. 6 is a flow-chart of an illustrative process for determining there are sufficient responses to the posted question in the network forum to exceed a threshold, in accordance with some disclosed methods and embodiments.

FIG. 6 is a flowchart of an exemplary process 600 for comparing the number of responsive network forum posts to a threshold. It should be noted that process 600 or any step thereof could be performed on, or provided by, any device shown in FIG. 2 and can incorporate various user interfaces (e.g., display of FIG. 2). For example, process 600 may be executed by control circuitry 228 (FIG. 2) of user equipment 218. In addition, one or more steps of process 600 may be incorporated into or combined with one or more steps of any other process or embodiment (e.g., incorporating process block 610 in response to a YES at process block 311 in process 300 of FIG. 3, replacing process blocks 602 and 603 with process blocks 401-407 in process 400 of FIG. 4, incorporating process block 610 in response to a YES at process block 509 in process 500 of FIG. 5). In addition, FIG. 1 provides a depiction of an exemplary embodiment of the processes described herein.

Steps 601-608 reflect the same steps and process reflected in FIG. 3 steps 303-310. At 609, if the processing circuitry determines that the response does not confirm the condition of the request is met, the identification application then reviews if the buffer time lapsed at 608. At 609, if the processing circuitry determines that the response does confirm the condition of the request is met, the identification application then reviews subsequent posts in the network forum for additional responses that confirm the condition of the request is met to verify if the number of responses exceeds a threshold saved in the identification application settings at step 610. For example, the threshold requires more than five posts that answer the question and confirm the condition of the request is met. In this example, if the identification application detects six forum posts made after the posted question that confirm the condition is met, the identification application may consider the threshold exceeded and may advance to step 611.

In another example, the threshold is dynamic and requires that a percent of the responses reviewed answer the question and confirm the condition of the request is met. In this example, the identification application may have a required confirming response percentage of 59% and may find there were five responses to the question. In this example, the identification application may determine that three of the five responses confirm the condition of the request is met and may consider the threshold exceeded because 60% of the responsive posts answer the question and confirm the condition of the request is met. However, if more responses to the question do not confirm the condition is met before the buffer time expires, the identification application may not confirm the threshold is exceeded.

At 610, if the processing circuitry determines that the number of responses confirming the condition of the request does not exceed the threshold, the identification application then reviews if the buffer time lapsed at 608. At 610, if the processing circuitry determines that the number of responses confirming the condition of the request does meet or exceed the threshold, the identification application then generates a notification to the user that the conditional request has been satisfied at 611 and provides the user access to the live stream that satisfies the conditional request at 612. For example, as shown in FIG. 1, notification 115 appears on the display of the user entertainment system as an overlay over the currently viewed media content, and the viewed media content is changed to the live stream that satisfies the criteria of conditional request 102.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:
1. A method comprising:
generating for output a first media stream to a device associated with a user profile;
determining that a second media stream would be relevant to the user profile if a particular event occurred in the second media stream;

automatically generating a first message associated with the particular event of the second media stream;

causing the first message to be posted in a network forum associated with the second media stream, wherein the network forum is accessible to a plurality of devices associated with other user profiles; and in response to determining that a second message on the network forum is a response to the first message and indicates the particular event is currently occurring in the second media stream, automatically causing the second media stream to be generated for output to the device associated with the user profile instead of the first media stream.

2. The method of claim 1, wherein:

determining that the second media stream would be relevant to the user profile if the particular event occurred in the second media stream comprises receiving input from a user associated with the user profile, wherein the input comprises a request for the second media stream to be generated for output when a criterion corresponding to the particular event is met; and the first message comprises a question based on the criterion.

3. The method of claim 2, wherein receiving the input comprises:

detecting, by a microphone, audio to activate a voice command system of the device at which the first media stream is being generated for output; and processing a voice command received by the voice command system to determine the criterion, wherein the criterion comprises a noun and a verb.

4. The method of claim 2, wherein receiving the input comprises:

receiving a text input, through a text input interface available on the device at which the first media stream is being generated for output; and processing the text input to determine a noun and a verb to determine the criterion, wherein the first message comprises the noun and the verb.

5. The method of claim 2, wherein causing the first message to be posted in the network forum associated with the second media stream comprises:

identifying a plurality of media streams, wherein each respective media stream is associated with corresponding metadata;

accessing a corresponding network forum of each respective media stream using the user profile;

searching the corresponding network forum of each respective media stream for metadata associated with the criterion; and causing the first message to be posted in a network forum that is identified based on the searching.

6. The method of claim 2, further comprising:

determining that the second media stream meets the criterion by:
identifying a noun and a verb in the criterion;
searching a plurality of messages for the noun and the verb;
identifying a subset of the plurality of messages, wherein each message in the subset of the messages comprises the noun, the verb, and a positive indicator;
calculating a number of messages in the subset of the messages; and
in response to determining that the number exceeds a threshold, determining that the second media stream meets the criterion.

7. The method of claim 2, further comprising:

determining that the second media stream meets the criterion by:
identifying a noun and a verb in the criterion; and
determining that text in the second message comprises the noun, the verb and a positive indicator.

8. The method of claim 2, wherein:

each of the input and the first message comprise a reference to an athlete;
the second media stream is a sporting event associated with the athlete; and
the criterion comprises whether the athlete is currently participating in the sporting event.

9. The method of claim 2, wherein causing the first message to be posted in the network forum associated with the second media stream comprises:

recording a posting time stamp of when the first message is posted to the network forum;
determining that a time elapsed from the posting time stamp is greater than a buffer time value;
in response to determining that the time elapsed is greater than the buffer time value:
generating a new question, wherein the new question is based on the criterion, and is caused to be posted in the network forum.

10. The method of claim 9, further comprising modifying the buffer time value when text of a message on the network forum includes a time when the criterion will be met.

11. A system comprising:

control circuitry configured to:
generate for output a first media stream to a device associated with a user profile;
determine that a second media stream would be relevant to the user profile if a particular event occurred in the second media stream; and
automatically generate a first message associated with the particular event of the second media stream;
input/output circuitry configured to:
cause the first message to be posted in a network forum associated with the second media stream, wherein the network forum is accessible to a plurality of devices associated with other user profiles;
wherein the control circuitry is further configured to:
in response to determining that a second message on the network forum is a response to the first message and indicates the particular event is currently occurring in the second media stream, automatically causing the second media stream to be generated for output to the device associated with the user profile instead of the first media stream.

12. The system of claim 11, wherein:

the control circuitry is configured to determine that the second media stream would be relevant to the user profile if the particular event occurred in the second media stream by receiving input from a user associated with the user profile, wherein the input comprises a request for the second media stream to be generated for output when a criterion corresponding to the particular event is met; and
the first message comprises a question based on the criterion.

13. The system of claim 12, wherein the input/output circuitry is configured to receive the input by:

detecting, by a microphone, audio to activate a voice command system of the device at which the first media stream is being generated for output; and processing a voice command received by the voice command system to determine the criterion, wherein the criterion comprises a noun and a verb.

14. The system of claim 12, wherein the input/output circuitry is configured to receive the input by:
   receiving a text input, through a text input interface available on the device at which the first media stream is being generated for output; and
   processing the text input to determine a noun and a verb to determine the criterion, wherein the first message comprises the noun and the verb.

15. The system of claim 12, wherein the input/output circuitry is configured to cause the first message to be posted in the network forum associated with the second media stream by:
   identifying a plurality of media streams, wherein each respective media stream is associated with corresponding metadata;
   accessing a corresponding network forum of each respective media stream using the user profile;
   searching the corresponding network forum of each respective media stream for metadata associated with the criterion; and
   causing the first message to be posted in a network forum that is identified based on the searching.

16. The system of claim 12, wherein the control circuitry is further configured to:
   determine that the second media stream meets the criterion by:
      identifying a noun and a verb in the criterion;
      searching a plurality of messages for the noun and the verb;
      identifying a subset of the plurality of messages, wherein each message in the subset of the messages comprises the noun, the verb, and a positive indicator;
      calculating a number of messages in the subset of the messages; and
      in response to determining that the number exceeds a threshold, determining that the second media stream meets the criterion.

17. The system of claim 12, wherein the control circuitry is further configured to:
   determine that the second media stream meets the criterion by:
      identifying a noun and a verb in the criterion; and
      determining that text in the second message comprises the noun, the verb and a positive indicator.

18. The system of claim 12, wherein:
   each of the input and the first message are associated with a particular athlete;
   the second media stream is a sporting event associated with the athlete; and
   the criterion comprises whether the athlete is currently participating in the sporting event.

19. The system of claim 12, wherein the control circuitry is configured to enable the input/output circuitry to cause the first message to be posted in the network forum associated with the second media stream by:
   recording a posting time stamp of when the first message is posted to the network forum;
   determining that a time elapsed from the posting time stamp is greater than a buffer time value;
   in response to determining that the time elapsed is greater than the buffer time value:
      generating a new question, wherein the new question is based on the criterion, and is caused to be posted in the network forum.

20. The system of claim 19, wherein the control circuitry is further configured to: modify the buffer time value when text of a message on the network forum includes a time when the criterion will be met.

* * * * *